Patented Oct. 17, 1933

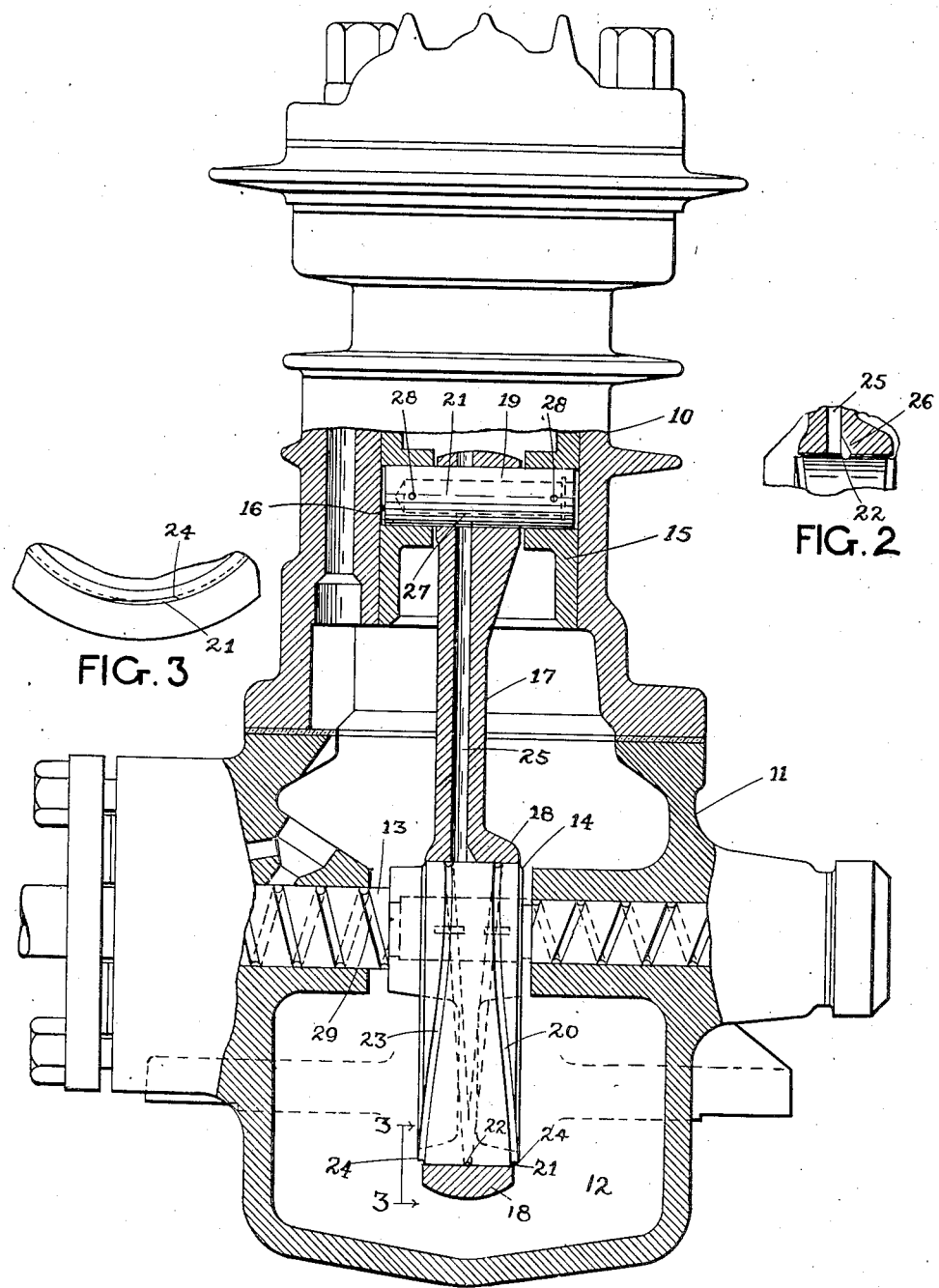

1,930,520

UNITED STATES PATENT OFFICE 1,930,520

REFRIGERATING APPARATUS

Daniel L. Kaufman, Dayton, Ohio, assignor to Frigidaire Corporation, Dayton, Ohio, a corporation of Delaware Application October 9, 1929. Serial No. 398,440

8 Claims. (Cl. 184—13)

This invention relates to refrigerating apparatus and especially to a positive means for lubricating bearings in the compressor of said refrigerating apparatus.

An object of the invention is to provide an economical but efficient means for lubricating the bearings of the connecting rod, piston pin and piston in a refrigerator compressor.

Another object of the invention is to provide means for lubricating the bearings thru passageways not exposed to the refrigerant gas passing thru the compressor.

Further objects and advantages of the present invention will be apparent from the following description, reference being had to the accompanying drawing, wherein a preferred form of the invention is clearly shown.

In the drawing:

Fig. 1 is a cross section thru a compressor to which the invention has been applied.

Fig. 2 is a view of a portion of the eccentric in elevation and a portion of the strap in cross section in a different position from that of Fig. 1.

Fig. 3 is a side view of a portion of the eccentric on line 3—3 of Fig. 1.

The problem of lubricating the bearings in a compressor of the type used in refrigerating apparatus differs from the lubrication of the bearings in compressors used for other purposes in that the compressor is part of a closed system with refrigerant gas passing therethru under a suction pressure. The suction pressure of the refrigerant gas has a tendency to carry the oil along with it especially if such oil is in the foamy state. It is undesirable to have the splasher used with other apparatus that will churn the oil into a foamy state and splash it around the compressor casing in a manner that will allow the refrigerant gas to carry it along to other parts of the apparatus where it is not desired. Accordingly it is one of the objects of this invention to pick up the oil from the oil reservoir and to direct it to bearings where it is desired thru passageways that are not exposed to the refergerant gas until the oil has reached the bearings. By this means the oil is applied to the bearings while it has a firm body and hence more efficient lubrication is accomplished thereby.

Furthermore it is an object of this invention to accomplish this lubrication in the manner described without the use of specially designed apparatus but to accomplish the result with the use of the normally essential parts of a refrigerating compressor modified to produce the result sought.

In Fig. 1 is disclosed a cross section thru a refrigerating compressor having the body 10 with a lower crank case portion 11 having an oil reservoir 12 in the low portion thereof. The operating shaft 13 is journalled in the crank case portion 11 and has attached thereto a cylindrical eccentric 14. In the upper portion of the compressor is the piston 15 operating in the cylinder 16. Any preferred type of connections may extend from the piston to the eccentric 14 in order that the piston may be operated by the eccentric. It is preferred however to have a connecting rod 17 having a strap portion 18 extending around the cylindrical surface of the eccentric. The upper part of the connecting rod 17 surrounds the piston pin 19 positioned in the piston 15.

A spiral groove 20 preferably begins at one edge of the cylindrical surface of the eccentric at the point 21 just outside the enclosing strap 18. This groove 20 preferably extends around the cylindrical surface of the eccentric under the strap to any desired length in a spiral and ends at a place 22 preferably substantially on the central plane thru the cylindrical surface. It is preferred as disclosed in the drawing to have the groove 23 start in a similar position to the edge of the cylindrical portion opposite the point 21 and likewise terminate in the same position 22, as disclosed in the full and dotted lines in Fig. 1. It will be noted that both the grooves 20 and 23 make approximately one revolution of the surface as disclosed in the drawings altho a longer or shorter path could be used as desired.

The beginnings of both the grooves 20 and 23 have a very sharp edge 24 as disclosed in Figs. 1 and 3. This sharp edge cuts thru the oil in the oil reservoir 12 and as the eccentric is revolved thru the oil, oil that is picked up by the grooves 20 and 23 is carried further down the groove largely by the friction against the interior surface of the strap until it reaches the end of the groove at 22.

The central part of the connecting rod 17 has been hollowed out to form a passageway 25 therethru. This passageway communicates as at 26 with the end of the groove 22 when the groove 22 reaches its upper most position as disclosed in Fig. 2. At the position in Fig. 2 the oil is directed or pushed into the passageway 25 and succeeding oil directed to the passageway 25 pushes the oil up the passageway 25 until it reaches the piston pin 19.

This piston pin 19 has a hollow central portion 26 into which the oil is directed thru an opening 27 connected to the passageway 25. At the end portions of the hollow portion of the piston pins are openings 28 thru which the oil passes to lubricate the bearing surfaces of the piston pin in the piston. The oil also lubricates portions of the piston where it slides within the cylinder 16. As the oil drips down the side of the casing to return to the oil reservoir a portion of it is brought in the spiral grooves 29 of the operating shaft 13 and effectively lubricate the bearing surface of the shaft, more fully described in application S. N. 266,071 filed March 30, 1928.

It will be noted that the efficient arrangement just described is very economical as it includes merely making certain grooves on the cylindrical surface of the eccentric and putting hollow passageways in the connecting rod and piston pin. There are no extra parts to be supplied to direct this oil to the places desired. Furthermore the oil passes directly from the oil reservoir thru interior passageways to the bearings desired and the oil is not churned up and exposed to the suction of the gas passing thru the compressor in a manner that would carry the oil to other parts of the apparatus such as the condenser, receiver and evaporator where it is not desired.

While the form of embodiment of the invention as herein disclosed constitutes a preferred form, it is to be understood that other forms might be adopted, all coming within the scope of the claims which follow.

What is claimed is as follows:

1. A compressor having a casing, an operating shaft in said casing, an eccentric on said shaft, a piston in said casing, connections between said eccentric and said piston, a portion of said casing adapted to act as an oil reservoir, said eccentric adapted to revolve in said oil reservoir, said eccentric having a groove therein for picking up said oil and said connections having passageways therethru for directing said oil to said piston.

2. A compressor having a casing, an operating shaft in said casing, an eccentric on said shaft, a piston in said casing, connections between said eccentric and said piston, a portion of said casing adapted to act as an oil reservoir, said eccentric adapted to revolve in said oil reservoir, said eccentric having a spiral groove therein for picking up said oil and said connections having passageways therethru for directing said oil to said piston.

3. A pump having a casing, an operating shaft in said casing, an eccentric on said shaft, a reciprocating member in said casing, connections between said eccentric and said member, a portion of said casing adapted to act as an oil reservoir, said eccentric adapted to revolve in said oil reservoir, said eccentric having a groove therein for picking up said oil and said connections having passageways therethrough for directing said oil to said member.

4. A pump having a casing, an operating shaft in said casing, an eccentric on said shaft, a reciprocating member in said casing, connections between said eccentric and said member, a portion of said casing adapted to act as an oil reservoir, said eccentric adapted to revolve in said oil reservoir, said eccentric having a spiral groove therein for picking up said oil and said connections having passageways therethrough for directing said oil to said member.

5. The combination of a supporting frame forming an oil well at its lower end, a drive shaft extending through said frame above said well, a reciprocating member above said shaft and a guide therefor, an eccentric on said shaft, a connecting rod having a head receiving said eccentric and journalled at its upper end in said member, said connecting rod head having a recess adjacent to said eccentric, there being an oil duct extending entirely through said connecting rod and terminating in said recess, said eccentric having oil grooves in its bearing face extending diagonally inwardly from the sides thereof and terminating to deliver oil to said recess during operation of the shaft whereby oil will be forced into and through said duct, and a hollow wrist pin receiving the oil from said duct and conducting it to the reciprocating member's bearing surface.

6. In combination of a supporting frame having an oil reservoir, a drive shaft rotatably supported in said oil reservoir, an eccentric on said shaft, a connecting rod having a head receiving said eccentric, said connecting rod head having a recess adjacent said eccentric, said eccentric having oil grooves in its bearing face extending diagonally inwardly from the sides thereof and terminating to deliver oil to said recess during operation of the shaft, a reciprocating member connected to the connecting rod remote from the head, a guide for said reciprocating member, an oil duct connecting said recess with the portion of the connecting rod remote from the head for supplying oil thereto.

7. The combination of a supporting frame having an oil reservoir, a drive shaft rotatably supported in said oil reservoir, an eccentric member on said drive shaft, a connecting rod member having a head at one end receiving said eccentric member, one of said members having a recess adjacent its bearing face and one of said members having an oil groove in its bearing face extending diagonally inwardly from one of its sides and terminating to deliver oil to said recess during operation of the shaft, a wrist pin, a reciprocating member connected to the other end of the connecting rod member by said wrist pin, an oil duct extending lengthwise of the connecting rod member and connecting the recess with the wrist pin end of the connecting rod member for supplying the wrist pin with oil.

8. The combination of a supporting frame having an oil reservoir, a drive shaft rotatably supported in said oil reservoir, an eccentric member on said drive shaft, a connecting rod member having a head at one end receiving said eccentric member, one of said members having a recess adjacent its bearing face and one of said members having an oil groove in its bearing face extending diagonally inwardly from one of its sides and terminating to deliver oil to said recess during operation of the shaft, said connecting rod member having a reciprocating member mounted upon its other end, an oil duct extending from said recess lengthwise of the connecting rod member to deliver oil to said reciprocating member.

DANIEL L. KAUFMAN.